UNITED STATES PATENT OFFICE.

JAMES BENTON PAGE, OF MOBILE, ALABAMA, ASSIGNOR, BY DIRECT AND MESNE ASSIGNMENTS, TO DIXIE FRUIT PRODUCTS COMPANY, OF MOBILE, ALABAMA, A CORPORATION OF DELAWARE.

STOCK FEED AND PROCESS OF MAKING SAME.

1,255,922.  Specification of Letters Patent.  Patented Feb. 12, 1918.

No Drawing.  Application filed June 27, 1917. Serial No. 177,268.

*To all whom it may concern:*

Be it known that I, JAMES BENTON PAGE, a citizen of the United States, residing at Mobile, in the county of Mobile and State of Alabama, have invented certain new and useful Improvements in Stock Feed and Processes of Making Same, of which the following is a specification.

This invention relates to stock feed and processes of making same; and it comprises as a new concentrated feed a shredded dry material representing in its composition watermelons or other melons minus a portion of the soluble sugars and also free of certain toxic bodies present in the melon, and particularly present in its seeds; and it further comprises a method of making such a feeding material wherein melons are chopped or otherwise comminuted and pressed to remove the juice and soluble matters as far as may be, and to form a press cake. This press cake is then further shredded, steamed, heated and once more pressed, the pressed material being thereafter dried in any suitable manner; all as more fully hereinafter set forth and as claimed.

The ordinary watermelon considered as a stock feed is of course not very good since it contains too much water. It is further somewhat diuretic and toxic, the active materials being mostly, though not wholly, contained in the seeds. Much of the feeding value however also resides in the seeds. On drying down the watermelon the product while giving a good fodder analysis is nevertheless not applicable to animal feeding purposes, being, as a matter of fact, rather poisonous. It is the object of the present invention to convert watermelons and other like melons, such as musk melons, into valuable concentrated feeds free of any toxic properties. Other melon-like fruits such as pumpkins, squashes, etc., may be similarly treated and I regard this invention as generally adapted to cucurbitaceous fruits, though best adapted to watermelons.

In making my stock feed I first take the melons as they come from the field and chop or mince them and then press. The juice produced while it may be utilized for conversion into vinegar or syrup is not further utilized in the present invention. The press cake obtained after its pressing operation contains practically all the food value of the original melon save the sugars contained in the expressed juice. The amount of this expressed juice which is removed of course depends on the pressure, etc. The pressed material or press cake is however not as yet adapted for drying and use. The press cake I next shred or otherwise comminute to obtain a mass of something the consistency of wet bran. This shredding may or may not be energetic enough to break up the seeds in large part. Advantageously and usually the seeds are broken or otherwise comminuted to a large extent. The shredded material is next cooked. This may be done in a variety of ways; but an advantageous way is to introduce steam under some pressure, but not too wet, into the material. Instead of direct steam, coil steam or jacket steam may be employed. The particular temperature employed depends somewhat upon the character of the melon and the climatic conditions. The cooking may be under vacuum or under pressure. This steaming cooks the rind and flesh of the melon and produces certain changes in the seeds. The fibrous constituents of the melon are also more or less changed in their character with advantage to their digestibility. The wet mass resulting from the steaming operation I place in a steam-jacketed kettle and apply sufficient heat to bring it to a boiling temperature; that is up to 100° C. or thereabout under ordinary atmospheric pressure. High or low pressures may be used. This heat need be maintained for only a few minutes. In the course of the steaming and of the boiling the toxic materials in the seeds are brought into solution and are changed in their character more or less. The steamed and cooked material is again pressed, the liquor extracted in this pressing operation being rejected so far as the feeding material is concerned. It is not useful in a feed because of its toxic nature; but it may be concentrated and used for medicinal purposes. From it may be prepared diuretic medicaments. The press cake formed in this second pressing operation may or may not be further washed. Generally washing is not necessary. The press cake may be dried in any usual way to form my final article.

This final article is a shredded bran-like material containing the original structural elements of the flesh and seeds of the melon, but free of most of the original dissolved materials. It is in particular free of the original toxic and diuretic bodies. It may be packaged and stored and shipped, being permanent in its character. It may be fed to stock in any desired way, either dried or made into cooked or other preparations of the nature of bran mash. The dry material usually carries about 15 per cent. protein and 7 per cent. of oils and fat. Analysis usually shows crude fiber to the extent of about 20 per cent. and the nitrogen-free extract, that is starch and other digestible carbohydrates, is about 50 per cent. Ordinarily I dry it down to about 5 per cent. moisture content.

My material may be said to be the original melon save that it is free of diuretic toxic bodies and is of greater digestive value, being in a measure "predigested" by the cooking operation.

What I claim is:—

1. As a new stock feed a dried material representing the structural elements of cucurbitaceous fruits but free of the soluble components thereof and also free of toxic components; such stock feed being a dried shredded material.

2. As a new stock feed a dried material representing the structural elements of watermelons but free of the soluble components and also free of toxic components; such stock feed being a dried shredded material.

3. The process of making stock feed which comprises pressing watermelons, steaming and cooking the pressed material, once more pressing, and thereafter drying.

In testimony whereof, I affix my signature.

JAMES BENTON PAGE.